United States Patent
Wang et al.

(10) Patent No.: US 10,157,320 B2
(45) Date of Patent: Dec. 18, 2018

(54) VEHICLE DETECTION METHOD BASED ON HYBRID IMAGE TEMPLATE

(71) Applicant: Institute of Automation, Chinese Academy of Sciences, Haidian District, Beijing (CN)

(72) Inventors: Feiyue Wang, Beijing (CN); Ye Li, Beijing (CN)

(73) Assignee: INSTITUTE OF AUTOMATION, CHINESE ACADEMY OF SCIENCES, Haidian District, Beijin (CN)

(*) Notice: Subject to any disclaimer, the term of this patent is extended or adjusted under 35 U.S.C. 154(b) by 85 days.

(21) Appl. No.: 14/392,309

(22) PCT Filed: Jun. 28, 2013

(86) PCT No.: PCT/CN2013/078393
§ 371 (c)(1),
(2) Date: May 31, 2016

(87) PCT Pub. No.: WO2014/205787
PCT Pub. Date: Dec. 31, 2014

(65) Prior Publication Data
US 2016/0259981 A1    Sep. 8, 2016

(51) Int. Cl.
*G06K 9/00*    (2006.01)
*G06K 9/62*    (2006.01)
*G06T 7/73*    (2017.01)

(52) U.S. Cl.
CPC ....... *G06K 9/00785* (2013.01); *G06K 9/6203* (2013.01); *G06T 7/74* (2017.01);
(Continued)

(58) Field of Classification Search
None
See application file for complete search history.

(56) References Cited

U.S. PATENT DOCUMENTS

| 8,340,435 B2* | 12/2012 | Duong | G06K 9/342 382/190 |
| 2006/0153459 A1* | 7/2006 | Zhang | G06K 9/3241 382/224 |

(Continued)

FOREIGN PATENT DOCUMENTS

| CN | 101976341 A | 2/2011 |
| CN | 102867416 A | 1/2013 |

(Continued)

OTHER PUBLICATIONS

Jang et al., "Car-Rec: A Real Time Car Recognition System", 2010 IEEE, 599-605.*

(Continued)

*Primary Examiner* — Randolph I Chu
(74) *Attorney, Agent, or Firm* — Merchant & Gould P.C.

(57) ABSTRACT

The invention discloses a vehicle detection method based on hybrid image template. This method consists of the three steps. Firstly, use no less than one vehicle image for template learning. Secondly, use information projection algorithm to learn a hybrid image template from the training images for vehicle object. The hybrid image template consists of no one less than image patch. Meanwhile, calculate the likelihood probability distribution of this template. Thirdly, use the learned HIT template to detect vehicle objects from testing images. The invention is suitable to detect vehicles with various vehicle shapes, vehicle poses, time-of-day and weather conditions. Besides vehicle localization, this method can also provide the detailed description of vehicle object.

11 Claims, 3 Drawing Sheets

(52) U.S. Cl.
CPC ............... *G06T 2207/30236* (2013.01); *G06T 2207/30252* (2013.01)

(56) References Cited

U.S. PATENT DOCUMENTS

| | | | | |
|---|---|---|---|---|
| 2010/0046842 A1* | 2/2010 | Conwell | ........... | G06F 17/30265 382/218 |
| 2011/0034176 A1* | 2/2011 | Lord | ................. | G06F 17/30244 455/450 |
| 2014/0079297 A1* | 3/2014 | Tadayon | .................. | G06K 9/00 382/118 |

FOREIGN PATENT DOCUMENTS

| | | | |
|---|---|---|---|
| CN | 103310469 | A | 9/2013 |
| JP | 2005-209097 | A | 8/2005 |
| KR | 100848145 | B1 | 7/2008 |
| KR | 20110139503 | A | 12/2011 |

OTHER PUBLICATIONS

Dalka et al. "Vehicle Classification Based on Soft Computing Algorithms", 7th International confurence, RSCTC2010, 70-79.*
Chen "Road Vehicle Classification using Support Vector Machines", Intelligent Computing and Intelligent Systems, 2009.*
Psyllos et al., "Vehicle Authentication from Digital Image Measurements", Jan. 2008.*
International Search Report for corresponding International Patent Application No. PCT/CN2013/078393 dated Jun. 28, 2013.

\* cited by examiner

VEHICLE DETECTION METHOD BASED ON HYBRID IMAGE TEMPLATE

This application is a National Stage Application of PCT/CN2013/078393, filed 28 Jun. 2013, and which application is incorporated herein by reference. A claim of priority is made to the above disclosed application.

TECHNICAL FIELD

The present disclosure belongs to domain field of vehicle detection, especially is a method of vehicle detection based on hybrid image template (HIT).

BACKGROUND

A video based vehicle detection technology plays a key role in traffic video surveillance systems, which provides vehicle information for these monitoring systems. In this technology, the mainstream vehicle detection methods apply vehicle motion features to classify the video image pixels as either foreground or background pixels. Then, the foreground pixels are combined to locate vehicles. But these methods are not suitable for the situations that vehicles slowly move (i.e. lacking motion information of the vehicle). Apart from the motion based vehicle detection method, the image features such as contour, Texture and the like are utilized to locate and detect vehicles in many researches. However, many researchers generally use a single or few image features for vehicle detection, and for the detected vehicles they just locate the vehicles without illustrating information such as contour, texture and the like.

Hybrid image template consists of multiple image patches with different image features. According to the types of these image features, the image patches are categorized as sketch patch, texture patch, color patch and flatness patch. This template can describe in detail various object features in various positions of an image object when it is applied for detecting object. Using multiple features in this template for vehicle detection improves the detection accuracy for locating the object. In addition, each of image patches in this template can locally perturb their locations and orientations during vehicle detection, which makes this template deformable to adapt the object. Therefore, this invention applies the hybrid image template to vehicle localization and detailed description of vehicle features in a complex traffic scene.

SUMMARY

In order to overcome the above mentioned one or more problems, the present invention provides a vehicle detection method based on hybrid image template, which achieves vehicle localization and detailed description of information such as vehicle's contour.

This invention provides a vehicle detection method based on hybrid image template comprising the following steps:

Step S1: No less than one vehicle image is collected as a training image.

Step S2: An information projection algorithm is utilized to learn all of image patches in a HIT for representing vehicle object from the training images and compute image likelihood probability distribution of this hybrid image template.

Step S3: The HIT learned from the step S2 is applied to detect vehicles from input testing images, and then to acquire the positions of vehicles in the testing images.

The step S3 further includes the following sub-steps.

Step S31: The SUM-MAX operation based on the HIT is used to detect vehicle candidate region with maximum vehicle detection score from the input testing image. The sub-step of D31 further comprises the following sub-steps.

Step S311: The Gabor wavelets with more than one orientation are utilized to filter the testing image to obtain sketch images with these orientations.

Step S312: A local maximization operation is applied to the sketch images to get a revised sketch image Step S313: The image patches in HIT is used to filter the testing image and, vehicle patch candidates are detected.

Step S314: The local maximization operation is applied to obtained vehicle patch candidates, and then the vehicle patch candidates are revised.

Step S315: The revised vehicle patch candidates are merged according to their relative positions and scales in HIT. Then, one or more vehicle candidates are generated from the testing image.

Step S316: The patches in the HIT and the image likelihood probability in the HIT are used to compute the vehicle detection scores of the vehicle candidate regions.

Step S317: The vehicle candidate region with the maximum vehicle detection score is extracted from all of the vehicle candidate regions.

Step S32: The maximum vehicle detection score is compared with a predefined vehicle detection threshold and an iterative method is utilized to obtain all of the vehicle objects in the testing images.

The vehicle detection method based on hybrid image template according to present invention has the following advantages:

(1) The invention applies the hybrid image template to model vehicle object. The hybrid image template integrates multiple different vehicle features, containing sketch, texture, color, flatness and the like which completely explains different features of different vehicle parts. Therefore, the vehicle detection method based on the template has the high accuracy and can be to various environments.

(2) During the vehicle detection, the SUM-MAX operation detects vehicles from the complex traffic scene based on the HIT, which not only locates the vehicles, but also describes vehicle information such as sketch and the like in detail. In addition, the SUM-MAX operation can adapt to slight vehicle deformation (that is, to adapt the slight variation of the type of vehicles and the slight variation of the gesture of vehicles).

DETAILED DESCRIPTION

The present invention will be illustrated in detail in conjunction with the particular embodiment and by referring to the accompany figures so as to clarify the object, technical solution and advantages of the present invention.

Figure 1:
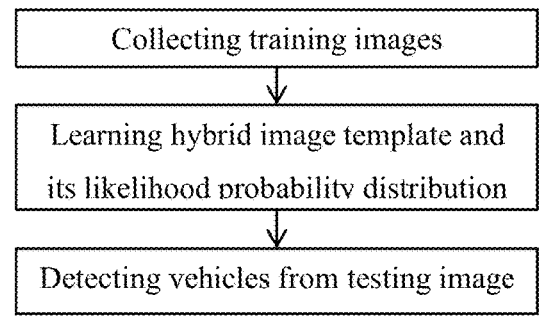
FIG. 1 shows a flowchart of vehicle detection method based on hybrid image template according to the present invention.

FIG. 1 shows a flowchart of vehicle detection method based on hybrid image template according to the present invention. As shown in FIG. 1, the vehicle detection method based on hybrid image template comprises the following steps.

Figure 2:
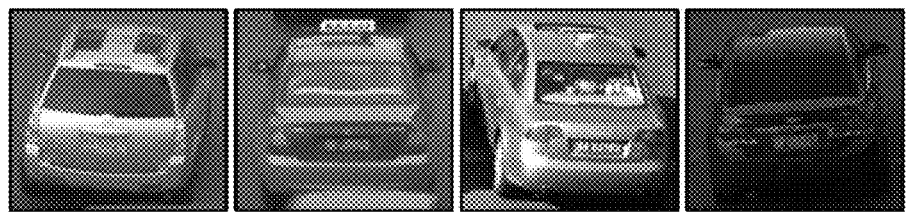
FIG. 2 shows a part of training images used in an embodiment of the present invention.

Step S1: No less than one vehicle image is collected as a training image. When the training image is selected, a plurality of pieces of image may be cut from actual traffic image as the training image. In an embodiment of the invention, 27 pieces of training images are acquired from traffic images as the training image. The number of training images is not restricted to 27 pieces, as long as no less than one piece of training image can be used. However, the more training images are applied to template learning, the better the detection accuracy of the method according to the present invention is. FIG. 2 shows a part of training images used in an embodiment of the present invention.

Step S2: An information projection algorithm is utilized to learn all of image patches in the HIT for representing vehicle object from the training images and to compute image likelihood probability distribution of this hybrid image template.

The HIT comprises one or more image patch. The image patches may be one or more of the following types of sketch patch, texture patch, color patch and flatness patch. In one embodiment of the present invention, the HIT utilizes various types of image patches such as etch patch, texture patch, color patch and flatness patch.

A sketch patch is modeled by a Gabor wavelet with one specific orientation. In an embodiment of the invention, sketch patches are modeled by Gabor wavelets with 16 orientations. The number of the Gabor wavelet orientations is not limited to 16, as long as the number of the Gabor wavelet orientation is no less than one.

A texture patch is modeled by gradient histogram of local rectangular image region for the corresponding training image. The length of the local rectangular image region is no less than two pixels. In an embodiment of the invention, the length and width of the training image both are 16, and the gradient histogram is acquired by computing statistics of Gabor wavelet filter responses of the local rectangular image region. It is not limited to the Gabor filter as long as it is the filter that may calculate the gradient of the image. The present invention is not limited to the Gabor filter with 16 orientations, as long as the number of the orientations of the Gabor filter is no less than 1.

A color patch is modeled by color histogram of local rectangular image region for the corresponding training image. The length and width of the image region are no less than two pixels. In an embodiment of the invention, the length and width of the training image both are 8 pixels, and the color histogram is acquired by computing statistics of pixel values of the three color channels in HSV color space of the local rectangular image region in the training image. The present invention is not limited to HSV color space and other color space may be selected. The present invention is also not limited to three color channels as long as it is no less than one color channel.

A flatness patch is modeled by superposition value of the responsive value of the Gabor filter for in one or more orientations in a local rectangular image region in the corresponding training image. The length of the local rectangular image region is no less than two pixels. In an embodiment of the invention, the length and width of the image region both are 8, and the flatness patch is acquired by computing sum of Gabor wavelet filter response values of the local rectangular image region in the training image region in 16 orientations. The computing method of the gradient statistic is not restricted to the above mentioned 16 orientations, as long as it is no less than one orientation.

Figure 3:
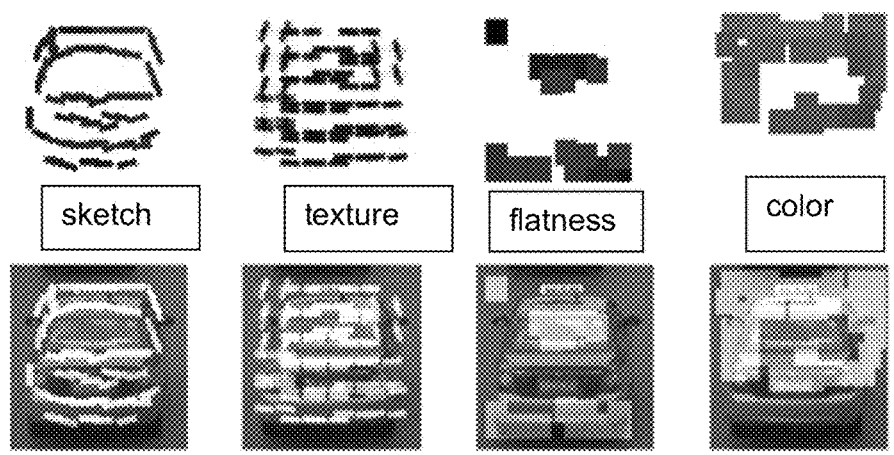
FIG. 3 is a schematic view of the hybrid image template in an embodiment of the present invention.
Figure 4:
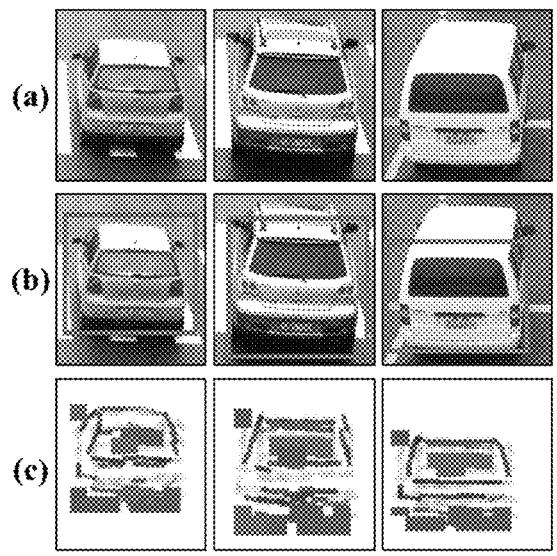
FIG. 4 shows vehicle detection results for different types of vehicles in an embodiment of the present invention.
Figure 5:
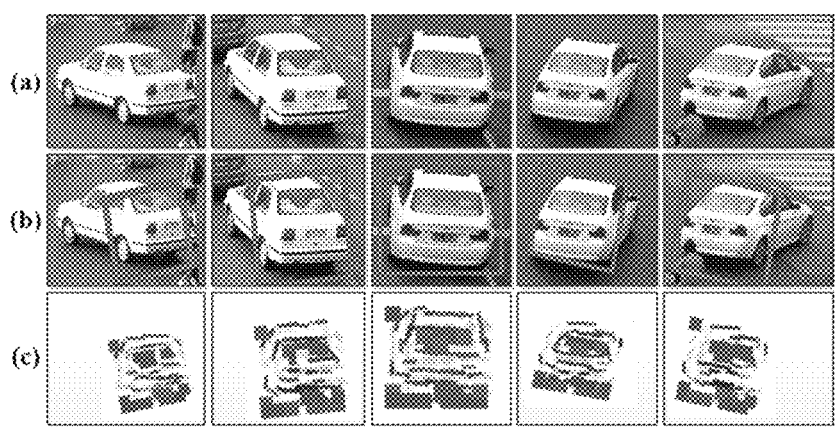
FIG. 5 shows vehicle detection results for different vehicle gestures in an embodiment of the invention.
Figure 6:
FIG. 6 shows vehicle detection results at different weather conditions and different time-of-day conditions in an embodiment of the invention.
Figure 7:
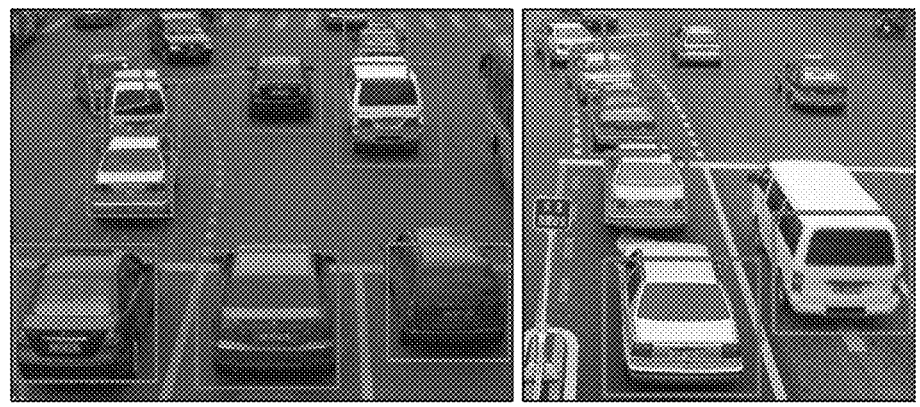
FIG. 7 shows vehicle detection results in complex city traffic conditions in an embodiment of the invention.

FIG. 3 shows a hybrid image template (HIT) for representing vehicle object which is learned in an embodiment of the invention. In this figure, the sketch patch, texture patch, color patch and flatness patch in HIT are shown in a form of gray image.

On the basis of the HIT, the likelihood probability of the HIT is also obtained by the information projection algorithm and denoted as the equation 1.

$$p(I \mid HIT) = q(I) \prod_{i=1}^{N} \frac{\exp\{\lambda_i r(I_{\Lambda_i})\}}{Z_i} \quad (1)$$

$\lambda_i$ $Z_i$ $r(I_{\Lambda_i})$ $I_{\Lambda_i}$ I where I is an image, HIT is the hybrid image template learned from training images, q(I) is a reference distribution, N is the number of the image patch in the HIT, $\lambda_i$ is the coefficient of the i-th image patch in the HIT, $Z_i$ is a normalization constant, $r(I_{\Lambda_i})$ is the similarity measure between an image region $I_{\Lambda_i}$ in I and the i-th image patch in the HIT.

Step S3: The HIT learned from the step S2 is applied to detect vehicles from the input testing image and then to acquire the position of vehicles in the testing images.

The process of vehicle detection is an iterative proves and comprises the following sub-steps.

Step S31: The summation-maximization (SUM-MAX) operation is utilized on the basis of the HIT to detect vehicle candidate with the maximum score from the input testing image.

The step S31 further comprises the following sub-steps.

Step S311: A Gabor wavelets with no less than one orientation are applied to filter the testing image, and then the sketch patches with these orientations are acquired. In such a step, the number of the orientations for the Gabor wavelets has to be more than or equal to the number of the orientations of the Gabor wavelets for describing the sketch patch in the step S2, has to be more than or equal to the number of the orientations of the filters used to calculating the gradient histogram of the texture patches in the step S2 and has to be more than or equal to the numbers of the orientations of the Gabor filters used for the flatness patches in the step S2.

In an embodiment of the invention, the Gabor wavelets with 16 orientations are used. The number of the Gabor wavelet orientations is not restricted to 16, as long as it is no less than one orientation.

Step S312: The local maximization operation is applied to the sketch image from step S3-1-1. That is to say, this operation perturbs the position and orientation of Gabor wavelets to locally search for the maximum of Gabor filter responses within the local image region. The Gabor filter responding results are revised as the maximum value to as the revised sketch image.

Step S313: The image patches in the HIT are utilized to filter the testing image, and to detect the vehicle patch candidates.

If the HIT contains the sketch patch, the texture patch, the color patch and the flatness patch, the step S313 further contains the following sub-steps.

Step S3131: The color patches in the HIT are used to filter the testing image to detect and obtain candidate color patches. Local image regions in the testing image are detected as color patch candidates and these local image regions have the similar color feature with the color patches in the HIT.

Step S3132: The sketch patches, texture patches, and flatness patches in the HIT are utilized to filter th the revised sketch image to detect and obtain sketch patch candidate, texture patch candidate and flatness patch candidates.

Step S314: The local maximization operation is applied to the obtained vehicle patch candidates (including the sketch patch candidate, texture patch candidate, color patch candidate and flatness patch candidate). That is to say, the position and the orientation of the image patch candidates are locally moved to search for the local maximum of patch filter responses value within the local image region and the filter response value of the image patch wherein the image patch candidate is positioned is revised as the maximum value to get the revised image patch candidate.

Step S315: The revised vehicle patch candidates are merged according to their relative positions and scales in the HIT. Then, one or more vehicle candidate regions are generated from the testing image.

Step S3-1-6: The patches in the HIT and the image likelihood probability are used to compute vehicle detection scores of the vehicle candidate regions.

In such as step, the vehicle detection scores of vehicle candidate regions are computed by equation 2.

$$\text{score}(I \mid HIT) = \log\frac{p(I \mid HIT)}{q(I)} = \sum_{i=1}^{N} \lambda_i r(I_{\Lambda_i}) - \log Z_i \quad (2)$$

where I is the vehicle candidate region in the testing image, HIT is learned in step S2, p(I)|HIT) is the probability distribution of I based on the HIT, q(I) is a reference distribution, N is the number of the image patches in the HIT, $\lambda_i$ is the coefficient of the i-th image patch in HIT, $Z_i$ is a normalization constant, $r(I_{\Lambda_i})$ is the similarity measure between an image region $I_{\Lambda_i}$ in / and the i-th image patch in the HIT.

Step S317: The vehicle candidate region with the maximum vehicle detection score is selected from all of the vehicle candidate regions.

Step S32: The maximum vehicle detection score is compared with a predefined vehicle detection threshold and an iterative method is utilized to get all of vehicle objects in the testing image.

The step of S32 is particularly shown as follows. The maximum vehicle detection score is compared with the predefined vehicle detection threshold. If the maximum vehicle detection score is no less than the vehicle detection threshold, the corresponding vehicle candidate region is detected as a vehicle object. Then, the detected vehicle object is removed from the testing image and the remaining image is used to detect the remaining vehicle objects by performing the step S31 iteratively until the maximum vehicle detection score is less than the vehicle detection threshold and the iterative process is ended so that all of the vehicle objects in the testing image is obtained. s.

The calculating of the vehicle detection thresholds may comprises the following sub-steps.

Step S321, the vehicle region is detected from all of the training images according to the step S31, and the detection scores for the corresponding vehicle regions are calculated.

Step S322, the vehicle detection threshold is estimated by utilizing the detection scores of vehicle regions for all of the training images.

When the vehicle detection threshold is estimated, one of the detection score of the vehicle region for all of the training image may be selected as the vehicle detection threshold.

FIG. 4-7 show vehicle detection results for different vehicle types, different vehicle poses, different period, different weather conditions and complex trasffice scene in accordance to an embodiment of the invention. FIGS. 4(a) and 5(a) are testing images, FIGS. 4(b) and 5(b) are vehicle positioning results of after detection, and FIGS. 4(c) and 5(c) are detection results of image patches within the vehicle regions.

The embodiment mentioned above explains the invention in detail. The invention is not restricted to the embodiment. In the principle of the invention, any modifications, substitution to same object, any improvement belong to the scope of protection of the invention.

We claim:

1. A vehicle detection method for detecting a vehicle image in measured images based on hybrid image template HIT, comprising the following steps:
    Step S1: collecting one or more vehicle images as training images;
    Step S2: utilizing an information projection algorithm to learn all of image patches for representing vehicle object in the HIT from the training images and to compute image likelihood probability distribution of this hybrid image template, wherein the HIT consists of the multiple patches with different image features which are categorized as sketch patch, texture patch, color patch and flatness patch, wherein the image likelihood probability distribution indicates occurrence probability of the HIT in conditions of the training image data;
    Step S3: detecting regions in which an image block of the HIT is present in the input testing image to acquire candidate vehicle regions in which the vehicles are located in the testing images;
    Step 3-1-6: using the patches in the HIT and the image likelihood probability to compute vehicle detection scores of the vehicle candidates region;
    Step S3-1-7: selecting the vehicle candidate regions with the maximum vehicle detection scores, comparing the maximum vehicle score with the predefined vehicle detection threshold; if the maximum vehicle detection score is no less that the vehicle detection threshold, determining the corresponding vehicle candidate region as a vehicle object, and determining the location and detail sketch information of the vehicle object;
    Step S32: removing the determined vehicle object from the testing image and using the remaining image to detect a next vehicle object and location and detail sketch information thereof by performing above steps, repeating above steps to detect all vehicle objects and location and detail sketch information thereof with an iterative method; and
    visually indicating in the input testing image the candidate regions determined to be vehicle objects.

2. The method according to claim 1, wherein the HIT consists of one or more types of image patches, containing sketch patch, texture patch, color patch and flatness patch.

3. The method according to claim 2, wherein the sketch patch is modeled by a Gabor wavelet with one specific orientation, the texture patch is modeled by gradient histogram of local rectangular image region for the corresponding training image region, the color patch is modeled by color histogram of local rectangular image region for the corresponding training image region, and the flatness patch is modeled by superposition value of the responsive value of the Gabor filter for in one or more orientations in a local rectangular image region in the corresponding training image.

4. The method according to claim 3, wherein the gradient histogram for the texture patch is acquired by computing statistics of Gabor wavelet filter responses of local rectangular image region in the corresponding training image region; The color histogram for the color patch is acquired by computing statistics of pixel values of the three color channels in color space of local rectangular image region; and the flatness patch is acquired by summing Gabor filter responses of local rectangular image region with one or more orientations.

5. The method according to claim 1, wherein the likelihood probability of the HIT computed by the information project algorithm is $$p(I \mid HIT) = q(I) \prod_{i=1}^{N} \frac{\exp\{\lambda_i r(I_{\Lambda_i})\}}{Z_i},$$

wherein I is an image, HIT is learned from training images, q(I) is a reference distribution, N is the number of the image patch in the HIT, $\lambda_i$ is the coefficient of the i-th image patch in the HIT, $Z_i$ is a normalization constant, $r(I_{\Lambda_i})$ is the similarity measure between an image region $I_{79\ i}$ in I and the i-th image patch in the HIT.

6. The method according to claim 1, wherein If the HIT contains the sketch patch, the texture patch, the color patch and the flatness patch, the step S313 further contains the following sub-steps:

Step S3131: the color patches in the HIT are used to filter the testing image to detect and obtain candidate color patches. Local image regions in the testing image are detected as color patch candidates and these local image regions have the similar color feature with the color patches in the HIT; and Step S3132: the sketch patches, texture patches, and flatness patches in the HIT are utilized to filter the revised sketch image to detect and obtain sketch patch candidate, texture patch candidate and flatness patch candidates.

7. The method according to claim 1, wherein the number of Gabor orientation used in step S3-1-1 is no less than the number of the Gabor orientation applied to describing sketch patch in step S2, the number of filter orientation applied to compute texture patch in step S2, the number of Gabor orientation applied to compute flatness patch in step S2.

8. The method according to claim 1, wherein the vehicle detection score of vehicle candidate regions are calculated by using the following formula:

$$score(I \mid HIT) = \log \frac{p(I \mid HIT)}{q(I)} = \sum_{i=1}^{N} \lambda_i r(I_{\Lambda_i}) - \log Z_i,$$

in which, I is the image region of a vehicle candidate in the testing image, HIT is learned in step S2, p(I|HIT) is the probability distribution of I based on the HIT, q(I) is a reference distribution, N is the number of the image patches in the HIT, $\lambda_i$ is the coefficient of the i-th image patch in HIT, $Z_i$ is a normalization constant, $r(I_{\Lambda_i})$ is the similarity measure between an image region in I and the i-th image patch in the HIT.

9. The method according to claim 1, wherein step S32 comprises: comparing the maximum vehicle detection score with the predefined vehicle detection threshold; determining, if the maximum vehicle detection score is no less than the vehicle detection threshold, that the corresponding vehicle candidate region is detected as a vehicle object; then, removing the detected vehicle object from the testing image an using the remaining image to detect the remaining vehicle objects by performing the step S31 iteratively until the maximum vehicle detection score is less than the vehicle detection threshold and the iterative process is ended so that all of the vehicle in the testing image is obtained.

10. The method according to Claim9, the vehicle detection threshold is computed by the following steps:

Step S321, the vehicle region is detected from all of the training images according to the step S31, and the detection scores for the corresponding vehicle regions are calculated;

Step S322, the vehicle detection threshold is estimated by utilizing the detection scores of vehicle regions for all of the training images.

11. The vehicle detection method according to claim 1, wherein Step S3 further comprises the following sub-steps:

Step S31: based on the HIT, the summation-maximization SUM-MAX operation is used to detect vehicle candidates with the maximum score from the input testing image, the Step S31 further comprising the following sub-steps;

Step S311: a Gabor wavelets with no less than one orientation are utilized to filter the testing image, and then the sketch patches with these orientations are acquired;

Step S312: the local maximization operation is applied to the sketch image to get a revised sketch image Step S313: the image patches in the HIT is used to filter the testing image and to detect vehicle patch candidates;

Step S3-1-4: the local maximization operation is applied to the obtained vehicle patch candidates to get the revised vehicle patch candidates;

Step S3-1-5: the revised vehicle patch candidates are merged according to their relative positions and scales in the HIT, and one or more vehicle candidate regions are generated from the testing image.

* * * * *